June 24, 1930.　　　G. L. FISK　　　1,768,044
FLEXIBLE ROLLER
Filed March 12, 1926　　2 Sheets-Sheet 1
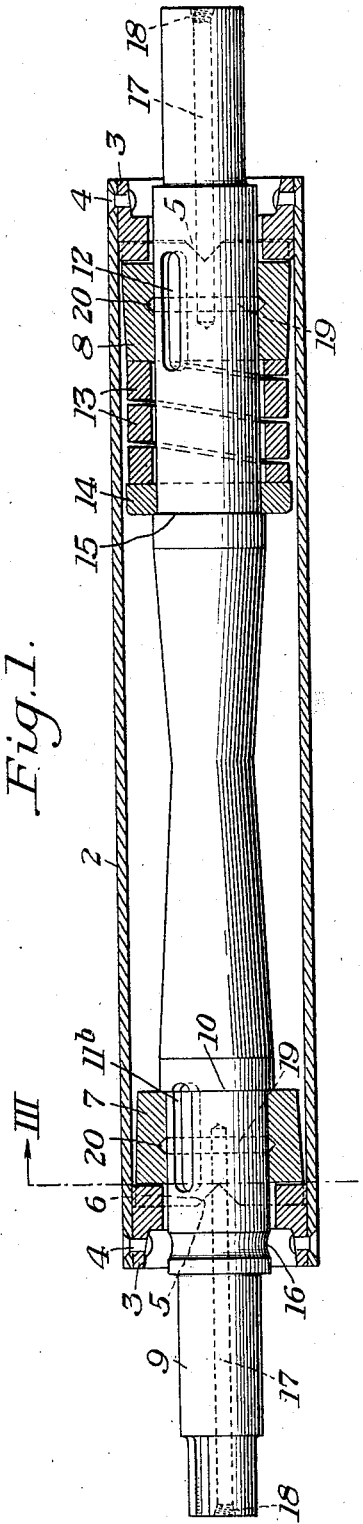
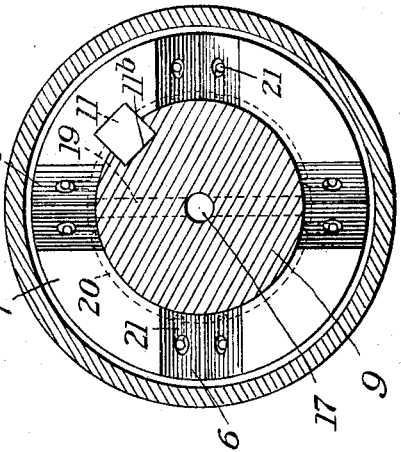
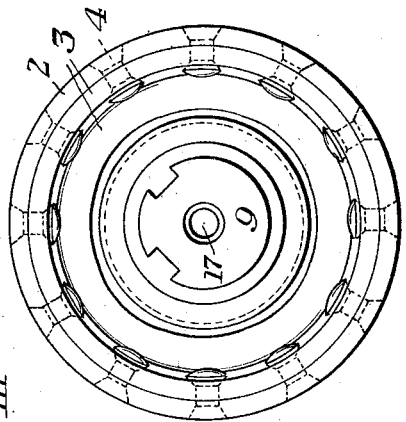
INVENTOR
Gustaf L. Fisk,
by his attys.
Byrnes, Stebbins Parmelee June 24, 1930. G. L. FISK 1,768,044
FLEXIBLE ROLLER
Filed March 12, 1926 2 Sheets-Sheet 2
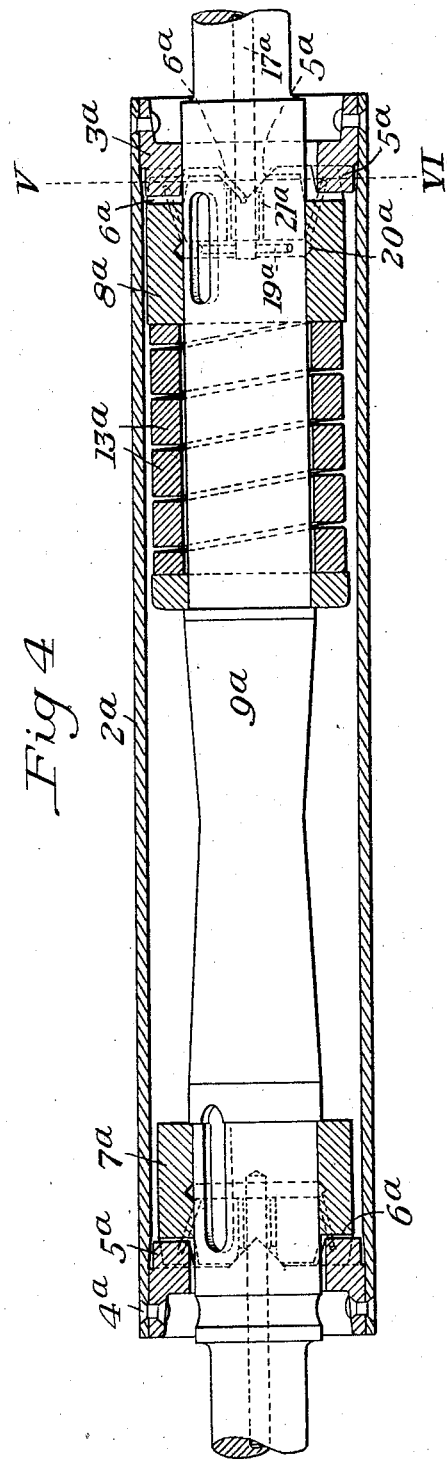
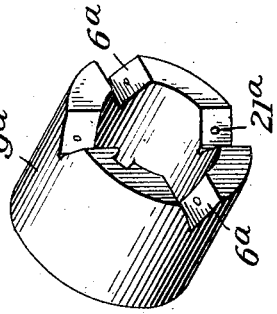
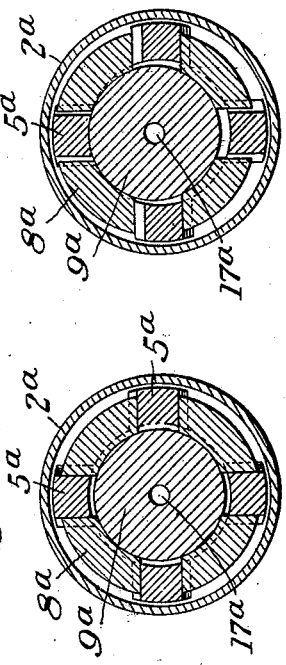
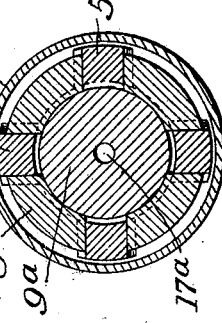
INVENTOR
Gustaf L. Fisk,
by his atty.
Byrnes, Stebbins Parmelee Patented June 24, 1930

1,768,044

UNITED STATES PATENT OFFICE

GUSTAF L. FISK, OF MIDLAND, PENNSYLVANIA, ASSIGNOR TO BLAW-KNOX COMPANY, OF PITTSBURGH, PENNSYLVANIA, A CORPORATION OF PENNSYLVANIA

FLEXIBLE ROLLER

Application filed March 12, 1926. Serial No. 94,209.

This invention relates to rollers used in conveying apparatus such as roll tables for rolling mill operations, but it will be understood that the invention has many other applications.

The rollers now employed in roller tables for steel mill work are generally made of a steel shaft and a cast iron or cast steel roller body machined to fit the shaft. The roller body is made hollow or solid, but in any event it is very heavy in proportion to the duty performed by the roller. However, it is essential that the heavy roller be provided in order to secure sound castings and to take care of shock loads. Even though these rollers are made especially heavy, they still break, crack and warp.

The heavy weight of the rollers requires a considerable amount of power to set the rollers in operation, thus necessitating the use of motors which are excessively large in view of the useful work performed in propelling an ingot a bloom, a billet or a bar of steel by turning the supporting rollers. In the case of reversing mills the speed of rolling is often limited by the speed at which the table rollers can be reversed.

Table rollers in steel mills are subject to shocks and blows from the material handled and the rigid rollers now employed frequently crack and break on account of such shocks and also warp on account of the uneven heating effected by the hot steel being handled. This warping frequently causes the roller shafts to get out of proper alignment with their bearings.

Table rollers for less severe service have been made of steel pipe forming the roller barrel and having cast iron or steel plugs fitted into the ends thereof and bored to fit the shaft of the roller. These rollers can be made materially lighter than the cast rollers but, due to the lack of flexibility, they are not adapted to withstand heavy blows and their use, therefore, is limited to the conveying of relatively light articles. I provide a roller which does away with the objections to both of the above types of rollers and forms an extremely satisfactory roller having very great strength and a certain amount of flexibility. My improved roller comprises a shaft, a relatively movable body and spring means tending to centralize the body on the shaft. Preferably, the spring surrounds the shaft and exerts a force endwise of the roller, which, through a connection such as a wedge means, acts on the body of the roller to centralize the same. When the roller is subjected to shock the spring is compressed and the roll body temporarily shifts to a non-central position relative to the shaft, but as soon as the shock is relieved the spring again centralizes the body on the shaft. Preferably the wedge means is provided at each end of the roll, but it is generally found necessary to provide only a single spring to effect the desired result. Lubricating means for the wedges may also be provided, the lubricant being preferably supplied through the roller shaft.

In the accompanying drawings illustrating a preferred embodiment of the invention:

Figure 1 is a longitudinal section through a table roller embodying the invention;

Figure 2 is an end view of the roller shown in Figure 1;

Figure 3 is a cross section of the roll taken generally on the line III—III of Figure 1, but with one of the wedge elements removed;

Figure 4 is a view similar to Figure 1 but showing a slightly modified form of roller and showing the roll body deflected at one end;

Figure 5 is a section taken through the roller of Figure 4 on the line V—VI and showing the parts in their normal position;

Figure 6 is a similar view taken on the line V—VI but showing the parts in the abnormal position of Figure 4; and Figure 7 is a perspective view of one of the wedge elements employed.

Referring first to Figure 1, there is shown a roller barrel 2 which is preferably made of lap welded pipe and having heads 3 in either end thereof. These heads are held in place by rivets 4. The heads 3 are preferably steel castings and on their interior faces they are provided with V-shaped wedge portions 5 which fit into similarly shaped grooves 6 on hubs 7 and 8. The hubs are carried on a shaft 9 and the hub 7 fits against a shoulder 10 on such shaft. A key 11 is provided in the keyway 11^b for preventing the hub 7 from rotating. The hub is preferably pressed onto the shaft so as to make a tight fit.

The hub 8 is slidably mounted on the shaft but is provided with a key engaging the keyway 12 in the shaft so as to prevent rotation of the hub relative to the shaft. A coil spring 13 surrounds the shaft and bears at one end against the hub 8 and at the other end against a collar 14 which fits over the shaft and is held in place by a shoulder 15. In assembling the roller endwise pressure is applied so as to place the spring 13 under compression and the head of the roller which is remote from the spring is then fastened in place. A groove 16 is provided in the shaft adjacent this head to permit insertion of the rivets 4.

There are preferably four wedges 5 and corresponding grooves 6 as shown in Figures 5 to 7 inclusive. The spring 13 presses the hub 8 outwardly and tends to hold the barrel 2 in a co-axial relation with the shaft 9. However, if a sudden load is placed on the roller, say, at the right hand end thereof as viewed in Figure 1, the roll body is deflected, but the wedges are effective for further compressing the spring 13 and as soon as the load is removed or diminished the hub 8 is moved endwise by the spring and the roll body is restored to its initial position. During this operation the roll body rocks around the wedges at the remote end of the roller.

Now assume that a load is suddenly applied to the left hand end of the roller as viewed in Figure 1. The roll body will tend to move to a non-axial position by forcing the wedge portions 5 out of their grooves 6. The hub 7 is immovable but the roll body itself will be displaced endwise slightly and the hub 8 will be moved and the spring 13 compressed as before. During this operation the roll body rocks about the wedge portions which cooperate with the hub 8.

In Figure 4 there is shown a roller intended for somewhat heavier service than the roller shown in Figure 1 and on this account the details of construction are changed somewhat, although the principle of operation remains the same. The parts which correspond to parts in Figure 1 have been given the same reference characters with the letter a suffixed thereto. The roller of Figure 4 is shown with the right hand end of the roll body displaced and the dotted lines will make it clear how the wedge portions 5^a move in the groove 6^a and force the hub 8^a to the left as viewed in the drawings. Figure 5 shows the parts in their normal relation while Figure 6 shows the same parts in the abnormal relation illustrated in Figure 4.

It will be understood that the wedge portions 5 or 5^a will move in their corresponding grooves in a greater or less amount, depending not only on the load applied, but also on the angular position of the wedges with respect to the direction of application of such load. For purposes of illustration I have shown the load as applied along the length of one pair of wedges and perpendicular to the other pair of wedges, but it will be understood that even though all of the wedges were at an angle to the direction of application of the load the action would be substantially the same.

Referring to Figures 4 and 6, it will be noted that the head 3^a is in contact at one point with the shaft 9^a. The shock load is largely absorbed by the spring 13^a, but in order to prevent overloading of the spring the clearance between the roller heads and the shaft and the inclination of the wedge faces 5^a and their corresponding grooves are so designed that a head will come into contact with the shaft under a predetermined load and thus limit the amount of movement of the roll body.

The roller automatically accommodates itself to changes in the lengths of the various parts due to heat as will be apparent. It will be understood that the roll body may rotate in a non-axial relation with the roll shaft due to the action of the wedges. Referring to Figure 2, it will be noted that the central openings through the heads 3 and 3^a are not truly circular but are provided with openings of varying radius. The clearance between the shaft and the heads is thus in a varying amount. This compensates for the difference in effectiveness of the wedges at varying angular positions with respect to the line of application of the load and makes the maximum allowed spring compression the same irrespective of the position of the roller.

In order to lubricate the parts I provide holes 17 in the shaft, these holes being substantially co-axial therewith. Preferably they are provided with threaded ends 18 for accommodating a plug or a grease gun connection. Cross bores 19 are provided, but these permit lubricant to flow to grooves 20 which are formed on the interior of the hubs 7 and 8. Holes 21 lead from the grooves 20 to each face of the wedges 5 or 5^a whereby the parts may be suitably lubricated.

I have illustrated and described a preferred embodiment and application of my invention, but it will be understood that its design and use may be varied as desired. For instance several springs may be used instead of one and various other changes may be made within the scope of the following claims.

I claim:

1. A roller comprising a shaft, a relatively movable roll body, and a wedge member on the shaft, the wedge member having a working face, the wedge having a lubricant passage therethrough terminating in an opening in the periphery of the shaft inside the wedge member, the wedge member having a cooperating lubricating passage terminating in the working face.

2. A roller comprising a shaft, a relatively movable body, a hub slidable on the shaft, and wedge means on the hub for controlling the movement of the roll body, the shaft having an opening extending therethrough for the supply of lubricant, the opening terminating within the hub, and the hub having an opening therein adapted to register with the opening in the shaft despite movement of the hub, the opening in the hub leading to the wedge means thereon.

In testimony whereof I have hereunto set my hand.

GUSTAF L. FISK.